(12) United States Patent
Webster et al.

(10) Patent No.: US 10,709,985 B2
(45) Date of Patent: Jul. 14, 2020

(54) AUTOMATIC GAME COMPARISON AND RECOMMENDATION

(71) Applicant: ELECTRONIC ARTS INC., Redwood City, CA (US)

(72) Inventors: Matthew Webster, Maiderhead (GB); Paul Ross, Guildford (GB); Steve Cuss, Farmham (GB)

(73) Assignee: Electronics Arts Inc., Redwood City, CA (US)

( * ) Notice: Subject to any disclaimer, the term of this patent is extended or adjusted under 35 U.S.C. 154(b) by 0 days.

(21) Appl. No.: 16/270,730

(22) Filed: Feb. 8, 2019

(65) Prior Publication Data

US 2019/0168123 A1 Jun. 6, 2019

Related U.S. Application Data

(63) Continuation of application No. 15/458,588, filed on Mar. 14, 2017, now Pat. No. 10,238,974, which is a continuation of application No. 14/700,754, filed on Apr. 30, 2015, now Pat. No. 9,630,111, which is a continuation of application No. 13/076,233, filed on Mar. 30, 2011, now Pat. No. 9,044,676.

(Continued)

(51) Int. Cl.
| | |
|---|---|
| A63F 13/67 | (2014.01) |
| A63F 13/798 | (2014.01) |
| A63F 13/795 | (2014.01) |
| A63F 13/30 | (2014.01) |
| A63F 13/35 | (2014.01) |

(52) U.S. Cl.
CPC .............. *A63F 13/67* (2014.09); *A63F 13/12* (2013.01); *A63F 13/35* (2014.09); *A63F 13/795* (2014.09); *A63F 13/798* (2014.09); *A63F 2300/556* (2013.01); *A63F 2300/558* (2013.01); *A63F 2300/5533* (2013.01); *A63F 2300/5566* (2013.01); *A63F 2300/5573* (2013.01)

(58) Field of Classification Search
CPC ..................................................... G07F 17/32
See application file for complete search history.

(56) References Cited

U.S. PATENT DOCUMENTS

| | | |
|---|---|---|
| 6,142,870 A | 11/2000 | Wada et al. |
| 6,241,524 B1 | 6/2001 | Aoshima et al. |

(Continued)

OTHER PUBLICATIONS

Electronic Arts. (Jul. 30, 2010). "Electronic Arts Terms of Service" located at http://globalwss.ea.com/sites/ermsarchive/Terms%20Archive/Terms_of Service/EN/PC/T .., 14 pages.

(Continued)

*Primary Examiner* — Reginald A Renwick
(74) *Attorney, Agent, or Firm* — Lowenstein Sandler LLP

(57) ABSTRACT

Methods and apparatus for automatic game generation are described. The method may include receiving, from a first video game console, a first game play result of a first user playing a video game; receiving, from a second video game console, a second game play result of a second user playing the video game; producing, by comparing the first game play result with the second game play results, a message comprising a recommendation for the first user to improve a future game play result over the first game play result, wherein the message further references the second game play result; and communicating the recommendation to the first user.

17 Claims, 13 Drawing Sheets

Related U.S. Application Data

(60) Provisional application No. 61/449,185, filed on Mar. 4, 2011.

(56) References Cited

U.S. PATENT DOCUMENTS

| | | | |
|---|---|---|---|
| 6,966,832 B2 | 11/2005 | Leen et al. | |
| 2007/0087799 A1 | 4/2007 | Van Luchene | |
| 2007/0167210 A1* | 7/2007 | Kelly | G07F 17/32 463/16 |
| 2009/0088233 A1 | 4/2009 | O'Rourke et al. | |
| 2009/0197681 A1 | 8/2009 | Krishnamoorthy et al. | |
| 2009/0299833 A1* | 12/2009 | Estep | A63F 13/12 705/14.1 |
| 2010/0062840 A1* | 3/2010 | Herrmann | G07F 17/32 463/25 |
| 2011/0092282 A1 | 4/2011 | Gary | |
| 2012/0083331 A1* | 4/2012 | Carpenter | G07F 17/3286 463/25 |
| 2017/0182424 A1 | 6/2017 | Webster et al. | |

OTHER PUBLICATIONS

USPTO, Office Action for U.S. Appl. No. 15/458,588, dated Oct. 3, 2018.
USPTO, Notice of Allowance for U.S. Appl. No. 15/458,588, dated Jan. 22, 2019.
USPTO, Office Action for U.S. Appl. No. 14/700,754, dated Sep. 24, 2015.
USPTO, Final Office Action for U.S. Appl. No. 14/700,754, dated Jan. 15, 2016.
USPTO, Office Action for U.S. Appl. No. 14/700,754, dated Jun. 30, 2016.
USPTO, Advisory Action for U.S. Appl. No. 14/700,754, dated May 19, 2016.
USPTO, Notice of Allowance for U.S. Appl. No. 14/700,754, dated Jan. 13, 2017.
USPTO, Office Action for U.S. Appl. No. 13/076,233, dated Mar. 28, 2012.
USPTO, Final Office Action for U.S. Appl. No. 13/076,233, dated Jan. 7, 2013.
USPTO, Office Action for U.S. Appl. No. 13/076,233, dated Dec. 6, 2013.
USPTO, Office Action for U.S. Appl. No. 13/076,233, dated Jul. 31, 2014.
USPTO, Office Action for U.S. Appl. No. 13/076,233, dated Nov. 10, 2014.
USPTO, Notice of Allowance for U.S. Appl. No. 13/076,233, dated Feb. 26, 2015.

* cited by examiner

AUTOMATIC GAME COMPARISON AND RECOMMENDATION

RELATED APPLICATION

This application is a continuation of U.S. patent application Ser. No. 15/458,588, filed Mar. 14, 2017, which is a continuation of U.S. patent application Ser. No. 14/700,754, filed Apr. 30, 2015, now U.S. Pat. No. 9,630,111, issued Apr. 25, 2017, which is a continuation of U.S. patent application Ser. No. 13/076,233, filed Mar. 30, 2011, now U.S. Pat. No. 9,044,676, issued Jun. 2, 2015, which claims the benefit of U.S. Provisional Application No. 61/449,185, filed Mar. 4, 2011, which are hereby incorporated by reference in their entirety.

TECHNICAL FIELD

Presently disclosed embodiments generally relate to video games, and more particularly to systems and methods for providing an enhanced gaming experience using social connection and comparison data to generate automatic game recommendations.

BACKGROUND

Video games can provide an enjoyable, socially connected competitive experience for a group of friends. Unfortunately, the logistics required to coordinate the busy schedules of such a group of friends who want to play with each other can be sufficiently burdensome as to prevent such experiences from happening at all. Instead, each member of the group might play the game at their convenience by themselves against non-player characters (NPCs) provided by the game, or against other players who happen to be available but who may not be part of the player's circle of friends.

Thus, it would be desirable to provide a means for allowing game players to connect with asynchronously in order to provide a meaningful game experience without requiring much effort on the part of the game players themselves.

SUMMARY

Systems and methods are presented for providing automatic game recommendations. In exemplary embodiments, the data for recommendation can come from comparisons based on information such as social connections among game players and their friends, games played, events played, scores, and achievements obtained in games or events played, or any combination thereof. Recommendations can be generated based on criteria such as what a player's friends have done in comparison to what the player has done. For example, a recommendation can be made based on how the game player compares at a particular moment in time with the results of a comparison against the game player's friends' play.

In an exemplary embodiment, a method includes receiving first game play results of a first user playing a game, retrieving other game play results of at least one other user playing the game, and comparing the first game play results with the other game play results producing a message based on the comparison, the message including a recommendation for the first user to improve future game play results over the first game play results, where the recommendation is based on the game play of the other user. The method can further include retrieving attributes 5 associated with the first user and attributes associated with the other user, comparing the first user and the other user attributes, and updating the recommendation based on the comparison. The other user can be a friend. The other user can be one of a group to which the user belongs, such as a geographical location common to the group members, a game entitlement common to the group members or a purchase history having something in common with group members. Exemplary embodiments also include a game system implementing the method and a non-transitory computer-readable storage medium used to perform the method.

The concept of friends can be broadly interpreted to include players who are connected explicitly or implicitly. For example, friends can be broadly interpreted to include people who are connected through a social network, people who are connected through varying degrees of friendship with others, or through other connections such as game players who play the same or similar games.

Other features and advantages of the invention will be apparent in view of the following detailed description and preferred embodiments.

DETAILED DESCRIPTION

The following detailed description is made with reference to the figures. Exemplary embodiments are described to illustrate the claimed invention, not to limit its scope, which is 20 defined by the appended claims.

Figure 1:
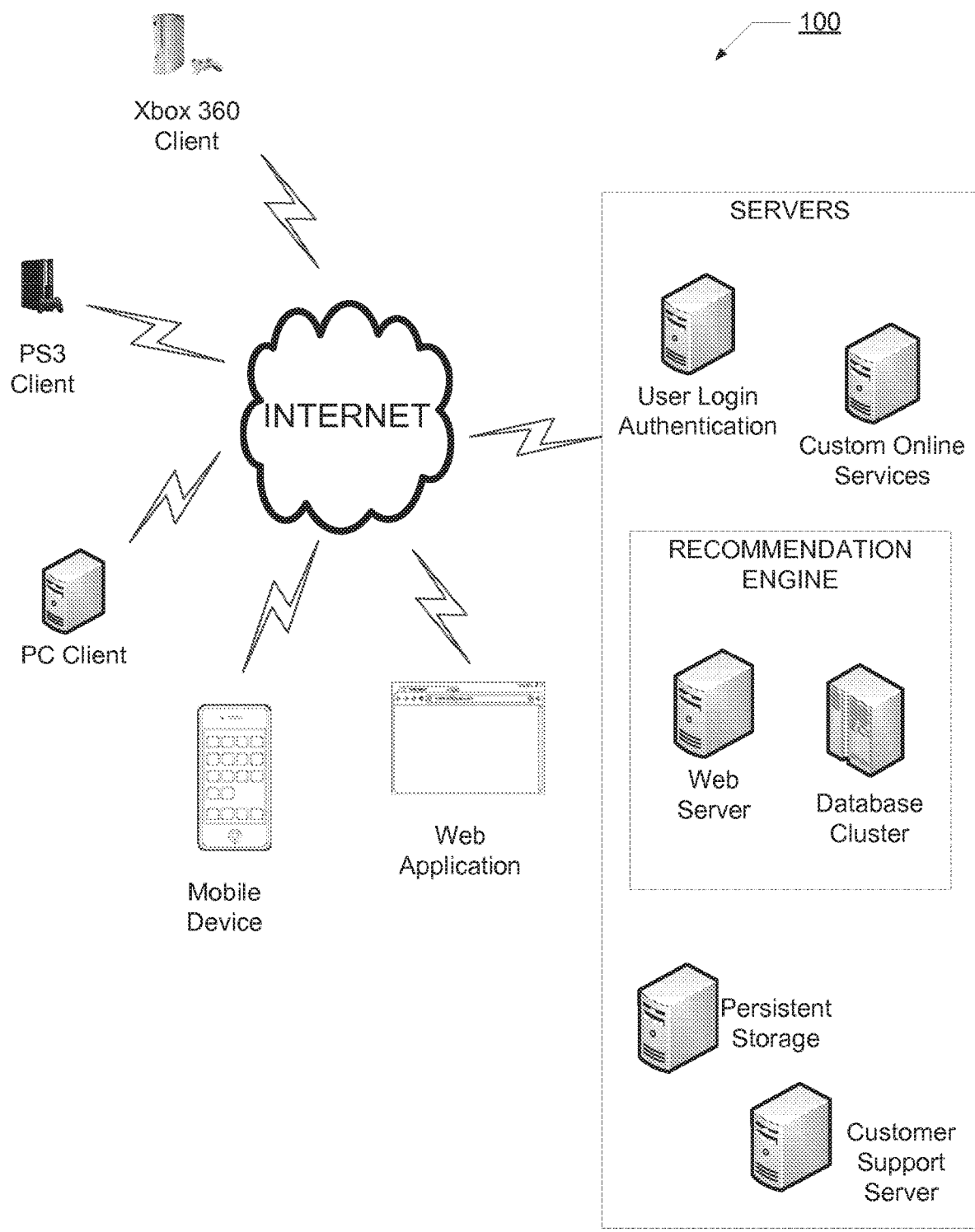
FIG. 1 is a network diagram illustrating an exemplary operating environment for automatic game comparison and recommendation.

FIG. 1 is a network diagram 100 illustrating an exemplary operating environment for an embodiment of an automatic game comparison and recommendation system. Video game players playing on game platforms such Xbox360, Playstation 3, personal computers (PC), mobile devices (such as the iPhone and iPad, or any mobile phone, tablet, etc.), and web devices can access servers through the Internet which provide functionality including game comparison and recommendation. The game itself can reside in any appropriately accessible location, for example, on the platforms or consoles themselves, or on one or more servers.

Typically, a group of friends who wish to play a video game together can have an enjoyable, socially connected competitive experience when they are all available at the same time to play. Unfortunately, the logistics required to coordinate and synchronize the busy schedules of such a group of friends can be sufficiently burdensome as to prevent such experiences from happening. Instead, each member of the group might play the game by themselves at their convenience, for example, in single player mode against non-player characters (NPCs) provided by the game. Alternatively, they might play against other players who happen to be available. Game play in this environment is asynchronous rather than synchronous. Opportunities for friends to play against each other are easily missed because they are not playing at the same time and do not necessarily know much about what their friends are playing. Also, opportunities for the game publisher to sell games and additional content are also missed because if a player were to find out that his friend was heavily engaged in a particular game and/or event within a game, that player might be motivated to spend money to get access that particular game and/or additional content in order to play and compete against his friend. Thus, it would be desirable to provide a means for allowing game players to connect with each other asynchronously in order to provide a meaningful game experience without requiring much effort on the part of the game players themselves.

In an exemplary embodiment, the player's game experience can be enhanced by generating recommendations that are based on criteria such as competition (a friend beat you), popularity (friends have played it), novelty (something is new to you, e.g., the game, event, level, location, asset, etc.), achievement (you are about to unlock new game content, win a medal or award, get to the next level, etc.). In an exemplary embodiment, the recommendation can have three parts: a friend story relating to what a friend has done to make a game or event interesting to you, a reason for the recommendation, and a call to action indicating what you can do in response to the recommendation. The recommendation reason can include any of the criteria mentioned above used for generating recommendations. A call to action can depend on the reason for the recommendation and on the game player's status in the game, for example, the position a player holds on a leader board, relative to the other players on it.

Figure 2:
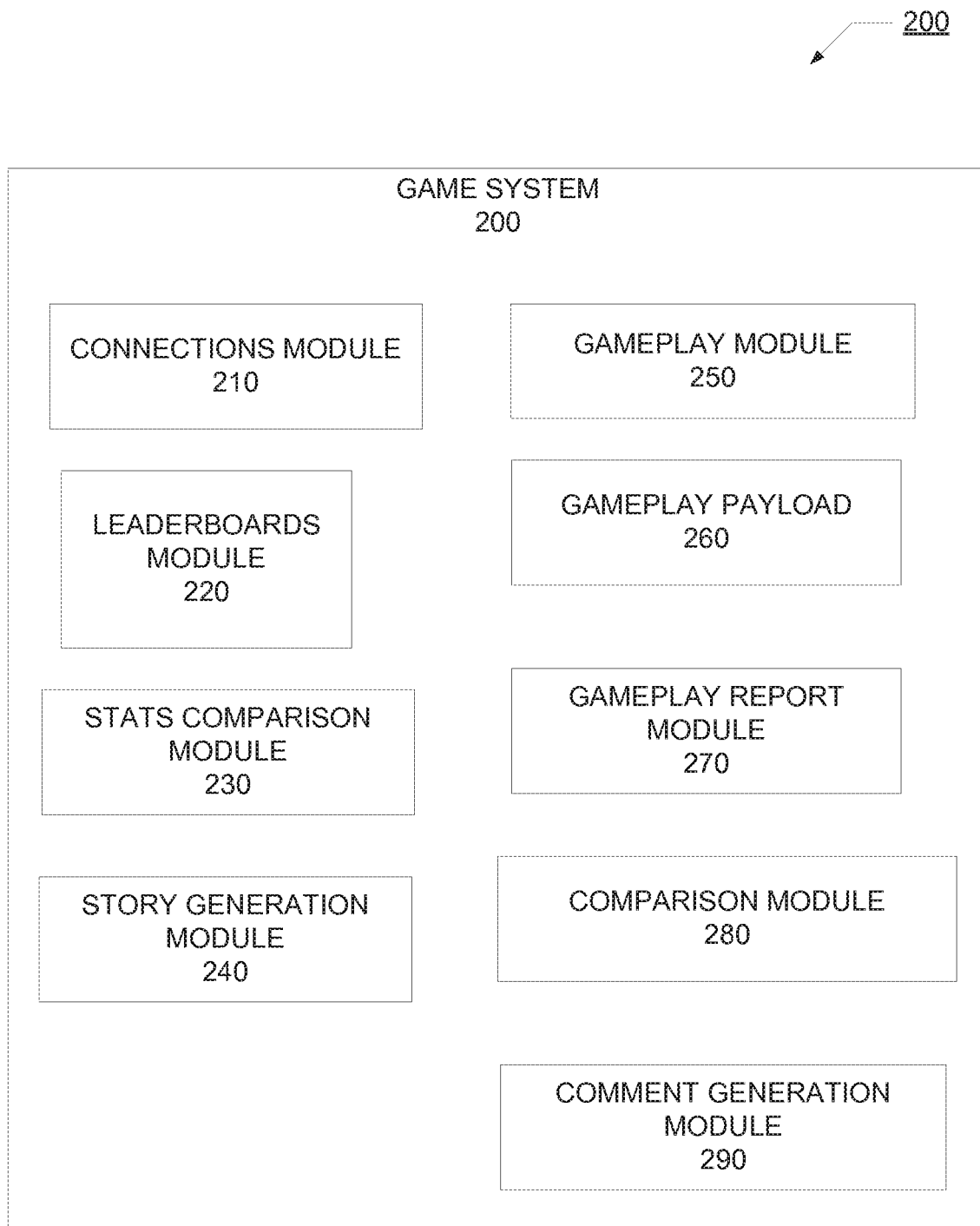
FIG. 2 is a block diagram illustrating an exemplary embodiment of a system for automatic game comparison and recommendation.

FIG. 2 is a block diagram illustrating an exemplary embodiment of a system 200 for automatic game comparison and recommendation. A game system can include a game play module 250 for running a video game, such as the popular car racing game "Need For Speed," published by Electronic Arts Inc. The game system can also include a game play payload 260 used for firing off particular events in the game, which are then played. For example, in a car racing game, the game play payload can provide an instruction to play a particular a particular junction, in a particular car, at night time, and with a particular traffic setting. The game can then respond by loading specified information such as the track, the car, the weather conditions, etc., and can allow the user to play that level. After the user plays the game, this information along with the score can be included in a game play report. The game play payload 260 and game play reporting module 270 can communicate with other modules including but not limited to a connections processing module 210, a leader boards processing module 220, a statistics processing module 230, a comparison module 280, a story generation module 240 and a comment generation module 290, as shown in FIG. 2.

In an exemplary embodiment, a game play report module 270 may be used in connection with a leader boards module 220 to process information relating to a game event. The game play report module 270 can be used for creating or updating leader boards, where the leader board is populated by a plurality of users (other game players) associated with a particular game player. Data representing this user association can be used to correlate players with each other and provide relevant recommendations for events they might be interested in playing. The plurality of users can be players who are friends of an individual game player. One example of this is users who are associated with the game player through friend relationships in a social network. Another example is users who are "friends of friends" in such a network.

Figure 3:
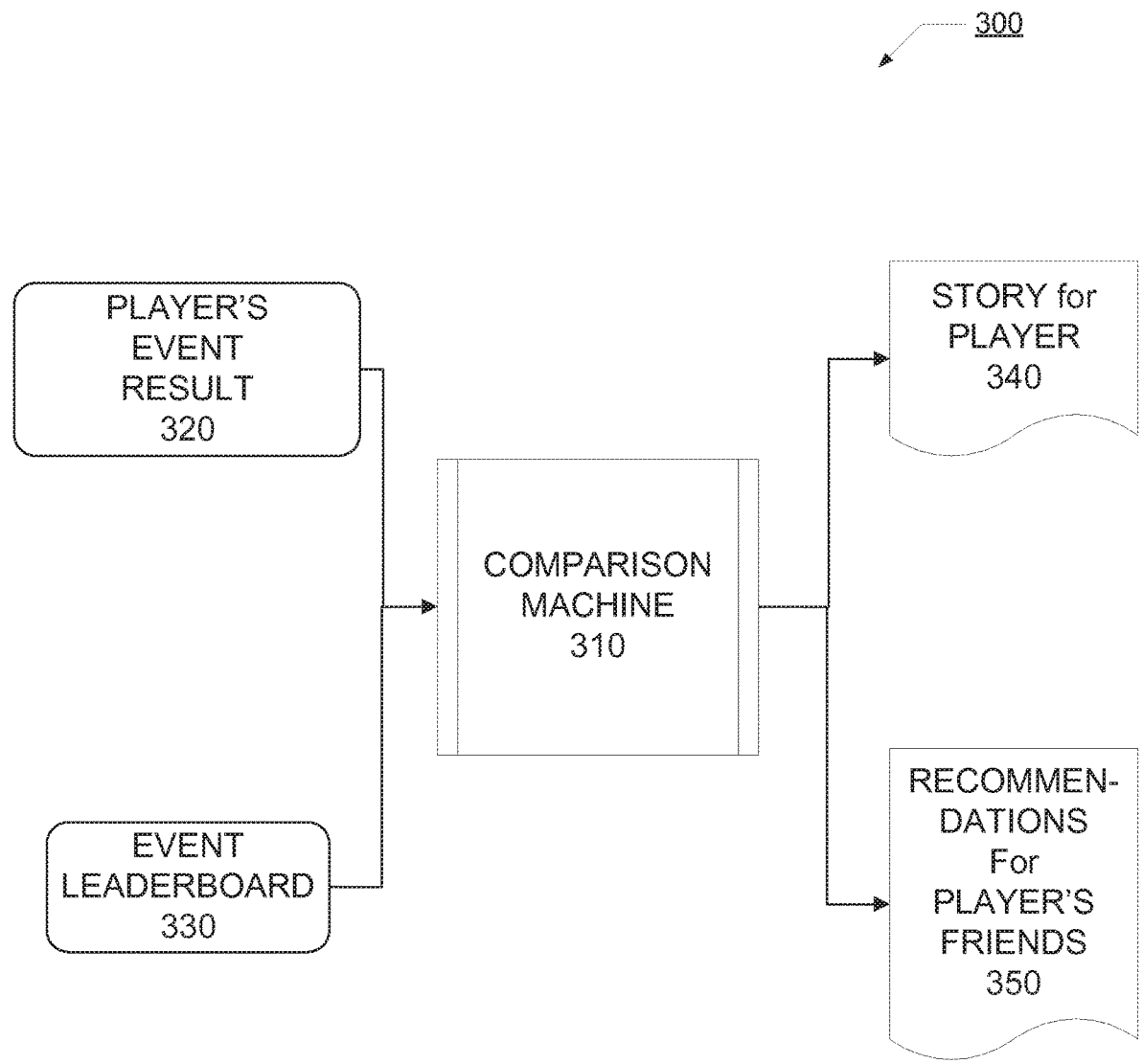
FIG. 3 is a diagram illustrating data flow in an exemplary embodiment.

FIG. 3 is a diagram illustrating data flow 300 in an exemplary embodiment. Data associated with the results of a player's performance in an event 320 and information from a leader board associated with an event 330 can provide the input to a comparison machine 310. The comparison machine 310 responds to the input to provide output such as stories for the player 340 and recommendations for the player's friends 350. A comparison machine designed for a car racing game is described in more detail in FIGS. 7-11 below. Variations on the comparison machine shown are also contemplated in accordance with exemplary embodiments to provide support for other game genres, events. etc. not specifically mentioned here.

In an exemplary embodiment, a leader board can be created for each event and be populated by the player's friends. This leader board can be used to drive other comparisons in the game. By creating a leader board showing event results for a player and his friends, and then presenting the leader board data to the friends in the player's network, the player may be encouraged to compete. For example, if the player has not played the game yet, he might want to try it and see how his performance matches up with his friends' performances. The player may want to know if he can you get to the number one (#1) ranking position with respect to his friends, or he may simply want to get to position #3, 4, 5, 6, etc. based on his capability. If the player has already played the game, he may want to know if he can move up in the rankings if he plays the game again.

TABLE 1

The following table shows an example leader board for a car racing game event called the ROADSTERS REBORN Race.

| Position | Player | Car Used | Attempts | Time |
|---|---|---|---|---|
| 1 | Steve Cuss | Porsche Boxster Spyder | 5 | 2:25.73 |
| 2 | Thomas | BMW Z4 | 3 | 2:30.13 |
| 3 | Craig Sullivan | Nissan 370z | 9 | 2:31.63 |
| 4 | Matt Webster | BMW Z4 | 1 | 2:34.52 |

Leader boards such as this one can be created for any event in the game as well as for various multiplayer game modes, tracking busts, pursuits and race wins. The leader board mechanism can be used for friend comparisons and for driving a comparison engine. In an example embodiment, the rankings shown on the leader board may be limited to a list of friends within a social network, rather than encompassing a whole world ranking of all players playing the game system worldwide.

Leader boards are useful for tracking any criteria of interest in the context of game play, and thus are not limited to use in racing games. Anything associated with a leader board can be a good candidate for providing a recommendation to other players. For example, in a soccer game such as FIFA, published by Electronic Arts Inc., correlations based on the number of goals scored for a soccer game can be used to connect players with similar skill levels. If a player typically achieves high scores, in the case where high scores indicate a high level of skill or proficiency (e.g., goals in soccer, achievement points in other games) then the system can generate recommendations suitable for similarly situated game players. Similarly, for games where a low score indicates a high level of skill or proficiency (e.g., a racing time in a car racing game), the system can generate recommendations suitable for similarly situated game players.

Comparisons based on game play experience timelines can also be used for generating recommendations in accordance with an exemplary embodiment. For example, if player A has owned the game for three weeks and has been playing the entire time, he has accumulated approximately three weeks' worth of experience with the game. If player B has owned the game for six months but has logged only about three weeks worth of game play, he has played the game for approximately the same amount of time (three weeks). If players A and B have similar skill levels, it is likely that they have progressed to approximately the same point in the game. Such players might have an interest in playing against each other, since they likely have enough common experiences with the game content that playing each other would be fun. Appropriate recommendations would be made to the players to reflect those potential interests.

Any information that can be used for ranking players against each other in their game play can be the basis for game recommendations. In an exemplary embodiment, is the number of consecutive passes in a soccer game. Players who have similar numbers of consecutive passes may be at a similar skill level, for example if the number of consecutive passes is high for both player A and player B, they are likely to both be skilled players. In another example, a player who is highly skilled in one game (game A) based on criteria that are relevant to that game, might also receive recommendations to play a different game (game B) for which the criteria determining skill are completely different. For example, a player who is highly skilled in a soccer game such as FIFA might be interested in a game-related recommendation regarding his friend who is highly skilled in racing games such as the Need for Speed and Burnout. Such a recommendation could be especially effective if each player rarely plays the other player's type of game (genre) and has limited exposure to it. By providing recommendations that are relevant to a game player's network of friends, the system can increase the adoption of games by players who typically limit themselves to one particular type of game or another, simply because they did not have anyone they wanted to play with.

Recommendations can also be made on other aspects of a game player's associations. For example, players who are associated with each other by criteria such as geographic location (e.g., fellow countrymen from the U.K.), clans (gamers who group together for purposes of playing a game), game play timelines (e.g., where you are in the game after N hours of play). In an exemplary embodiment, recommendations can also be made on information relating to a game player's purchases. For example, the player of a game for which packs of virtual trading cards are sold, e.g., BattleForge, FIFA Ultimate Team (soccer), Madden Ultimate Team (football), and NHL Hockey Ultimate Team, published by Electronic Arts Inc., a player can receive a recommendation based on information about the contents of the virtual trading card packs he owns. This information could include recommendations to purchase card packs that would complement or improve the player's current collection. The recommendation could include information about the player's friend's virtual trading card collections as compared to his own, for example, if a player could gain advantage over a friend by purchasing additional cards or card packs, a recommendation could be made to that effect. Similarly, if a player plays one particular virtual card trading game such as FIFA Ultimate Team, he might receive a recommendation that he might enjoy purchasing virtual trading cards for Madden Ultimate Team in order to play against his friend who understands how to play football but not soccer.

A player can also receive recommendations based on attributes such as game entitlements or game assets. A player whose friend has just downloaded a particular new map in a game might receive a recommendation to purchase the same map so that they can play together. A player whose friend owns a significantly higher powered gun, car, or other game asset can receive recommendation regarding how he can upgrade his own game assets. Further examples exist that are within the spirit and scope of the invention but which are not specifically stated herein.

Story Generation

Figure 4:
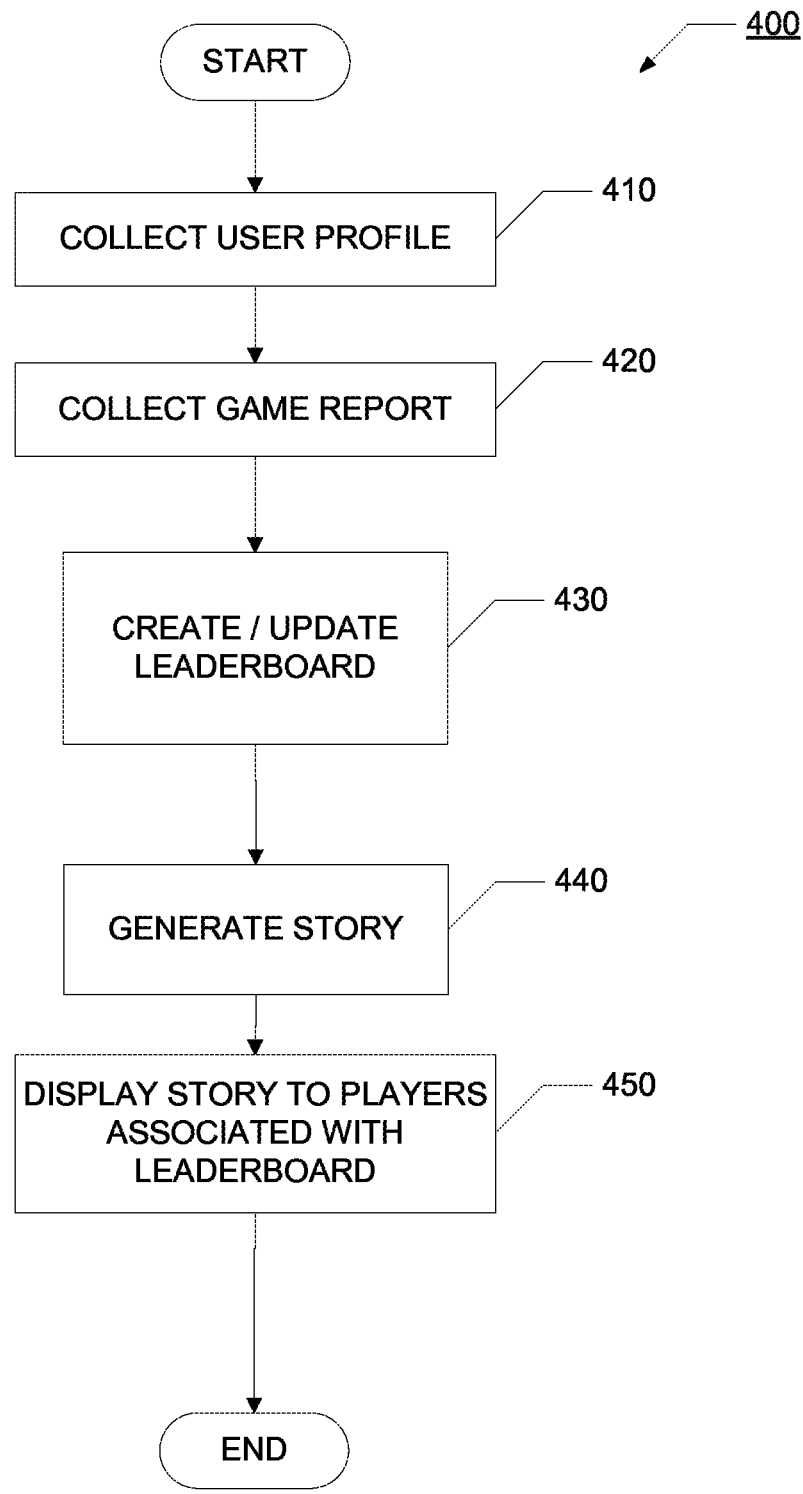
FIG. 4 is a flow chart illustrating a method for generating stories in an exemplary embodiment.

FIG. 4 is a flow chart 400 illustrating story generation in an exemplary embodiment of a system for automatic game comparison and recommendation. A method for generating a story associated with a leader board can include the steps of collecting a player profile 410, collecting a game report associated with the player profile 420, updating a leader board in accordance with information contained in the game report 430, generating a story based on the comparison 440, and displaying the generated story to game players associated with the generated leader board 450. If the leader board does not initially exist, then a leader board can be created.

The generated story may be based on information associated with various sources such as the games being played, the game play report, where the game players are in relation to each other on the leader board, and other known information about players who are associated with each other or related to each other based on various criteria. The criteria may reflect any association among game players, for example, players who are associated with each other through a social network, friends list, or buddy list. Associations can be based any criteria that can be used to connect like-minded players with each other, for example, clan membership, country, team preferences (which can be based on criteria such as country), game preferences, games played, and genre preferences (racing games, shooters, sports, RPGs, etc.).

Recommendations

Figure 5:
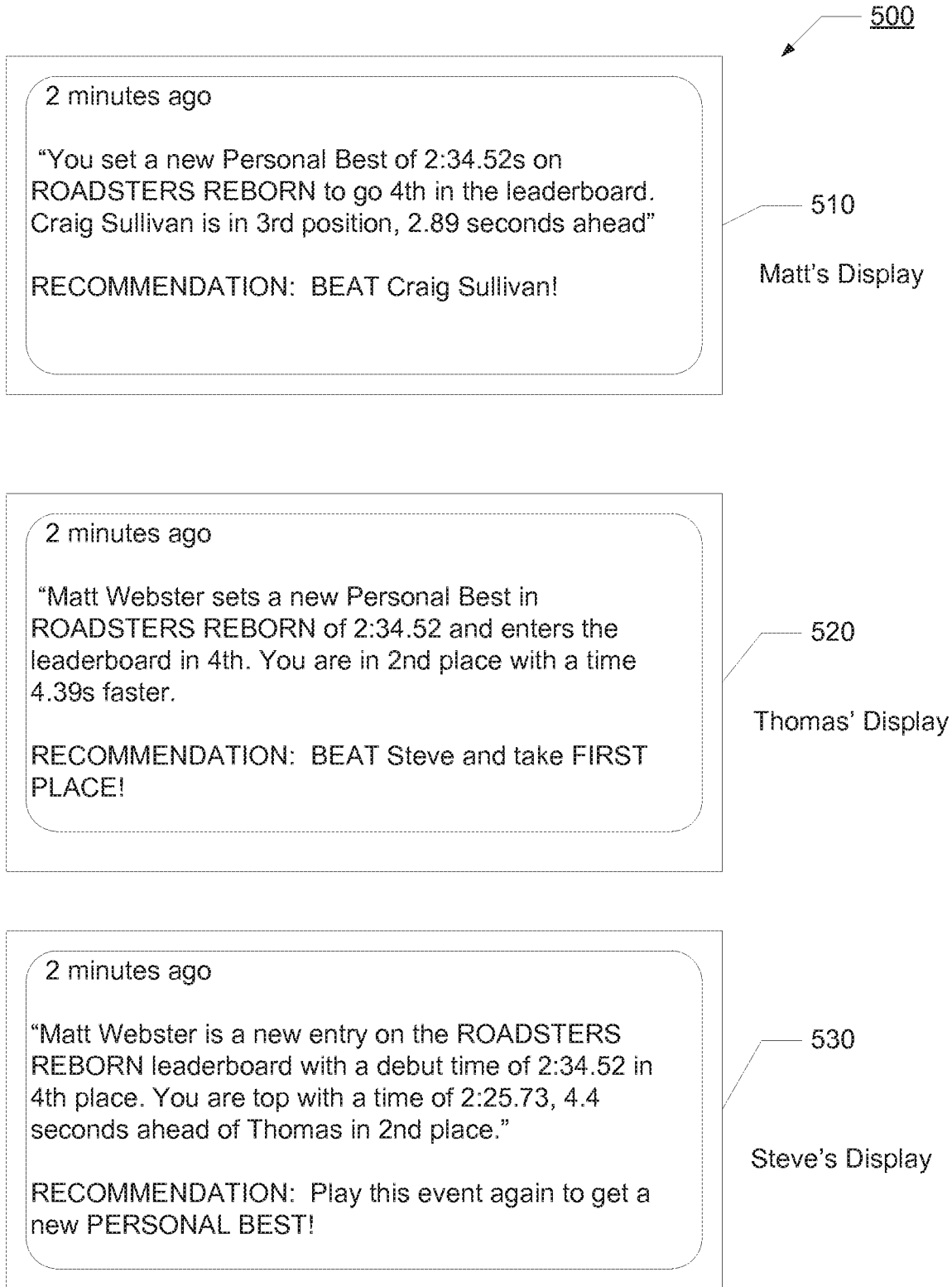
FIG. 5 is a diagram illustrating a user interface showing story information generated by an exemplary embodiment.

FIG. 5 is a diagram 500 illustrating a user interface showing story information generated by an exemplary embodiment of a system for automatic game comparison and recommendation. This diagram illustrates an example of what can appear on the hardware displays of three of the players listed in the leader board shown in Table 1. At the top of FIG. 5, Matt's display 510 shows that he is informed that two minutes ago, he "set a new Personal Best of 2:34.52 s on ROADSTERS REBORN to go 4th in the leader board" and that his friend Craig Sullivan "is in 3rd position, 2.89 seconds ahead." Matt can get a recommendation to race again to beat Craig Sullivan. Similarly, Thomas' display 520 shows that two minutes ago, "Matt Webster sets a new Personal Best in ROADSTERS REBORN of 2:34.52 and enters the Leader board in 4th" and that Thomas is "in 2nd place with a time 4.39 s faster." Thomas can get a recommendation to beat Steve who is in first place. On the bottom of FIG. 5, Steve's display 530 shows that two minutes ago "Matt Webster is a new entry on the ROADSTERS REBORN SpeedWall with a debut time of 2:34.52 in 4th place" and that Steve is "top with a time of 2:25.73, 4.4 seconds ahead of Thomas in 2nd place." Steve can get a recommendation to play the event again to achieve a new personal best.

Figure 6:
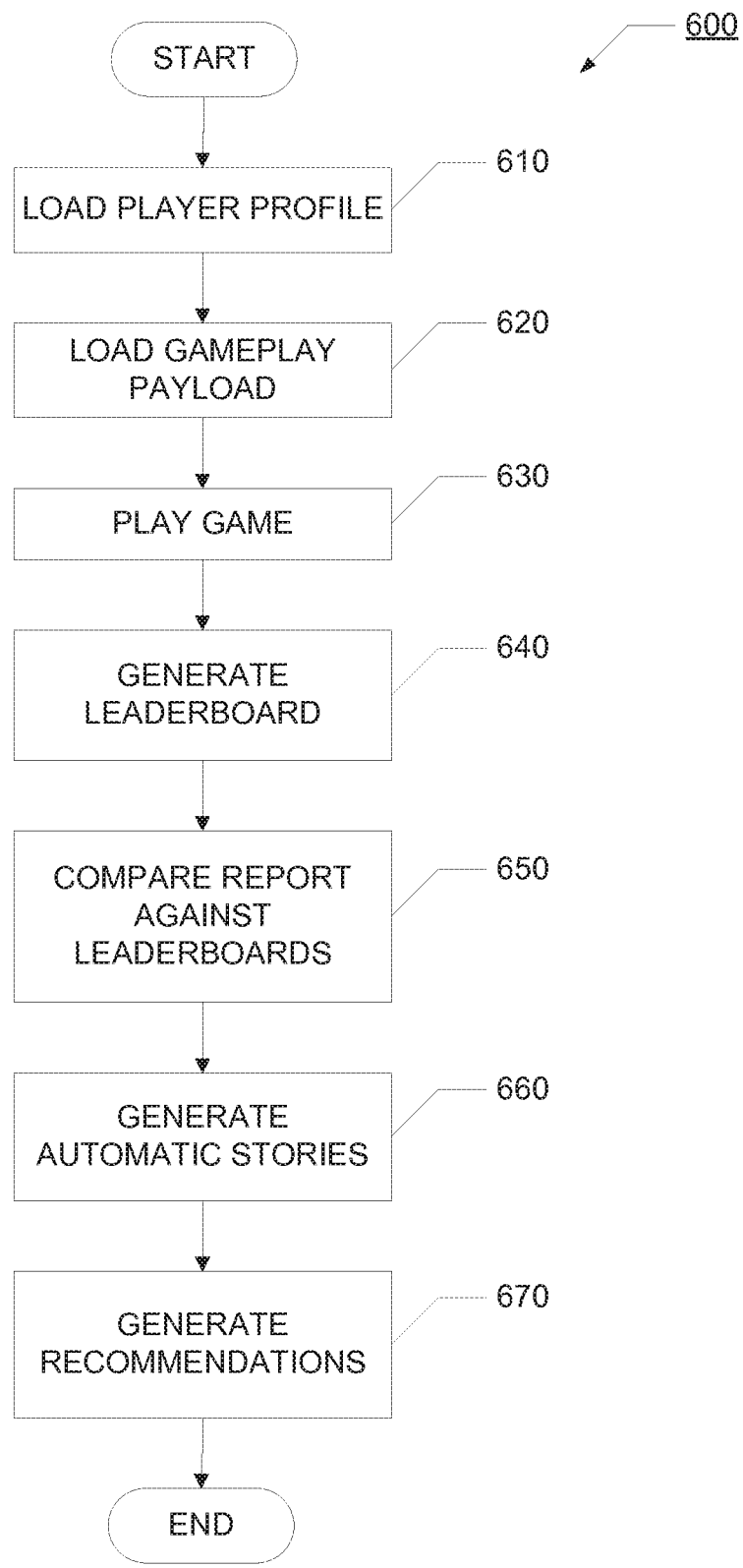
FIG. 6 is a flow chart illustrating a method for generating recommendations an exemplary embodiment.
Figure 7:
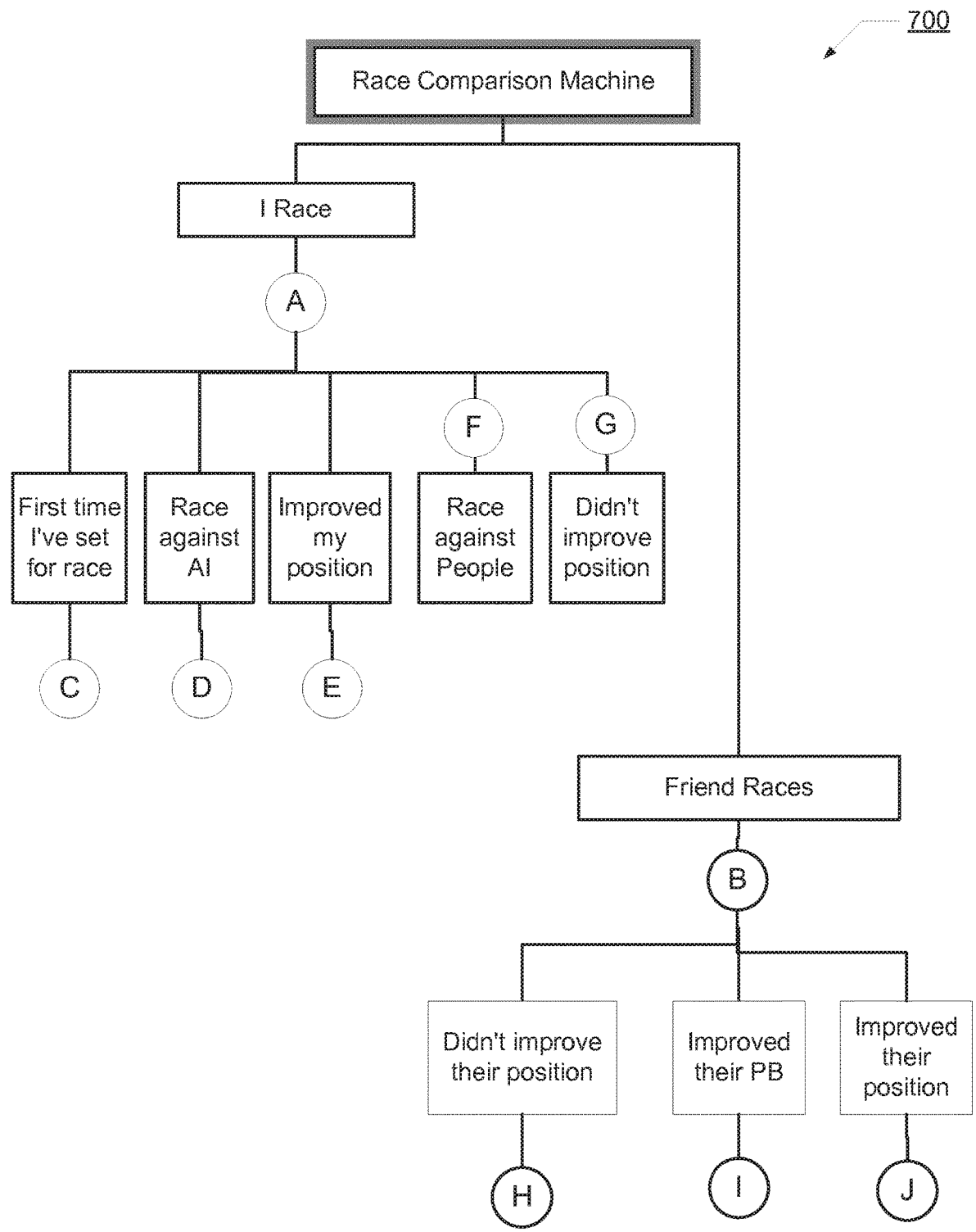
FIG. 7 is a block diagram illustrating a portion of an exemplary embodiment of a comparison machine.
Figure 8:
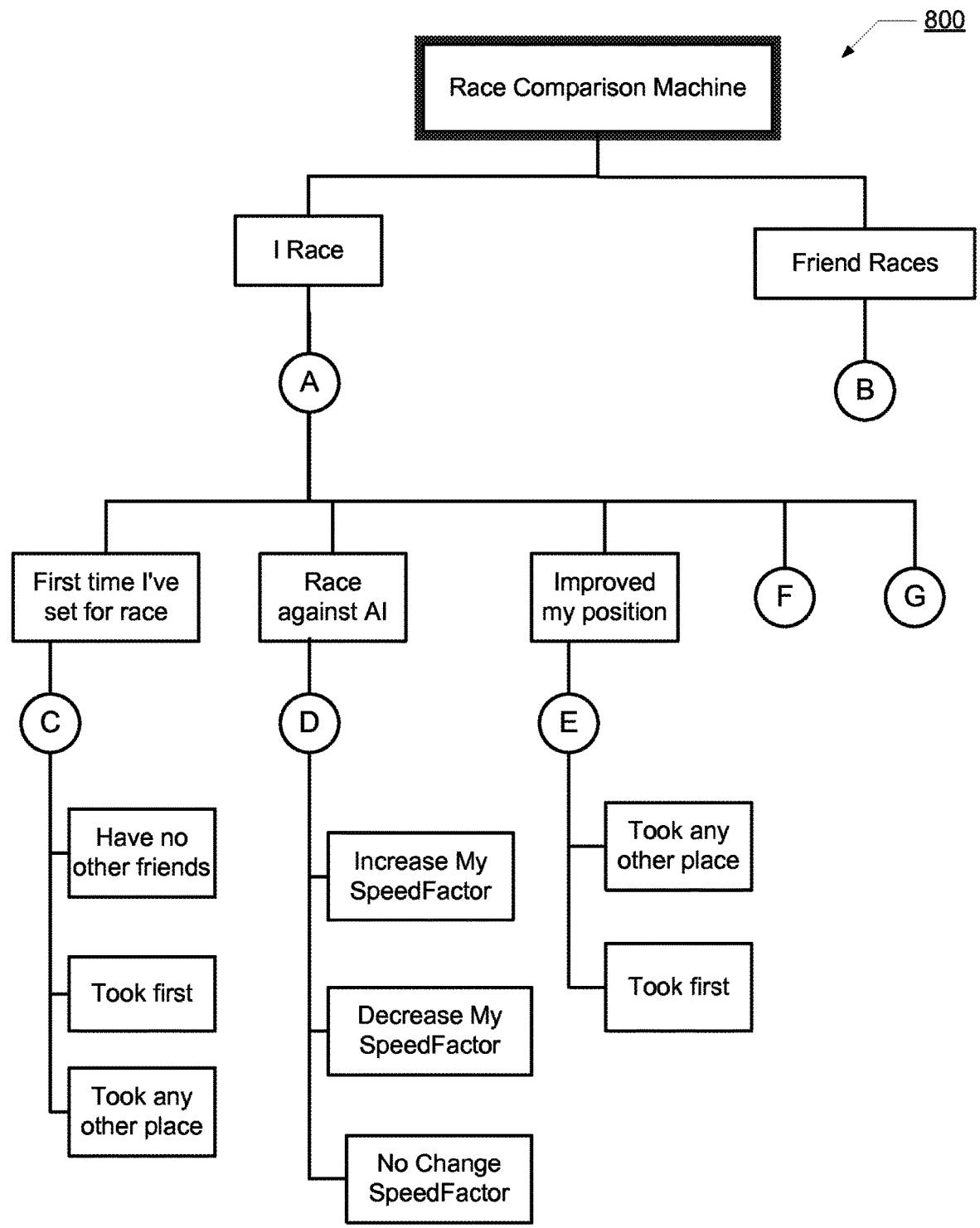
FIG. 8 is a block diagram illustrating a portion of an exemplary embodiment of a comparison machine.
Figure 9:
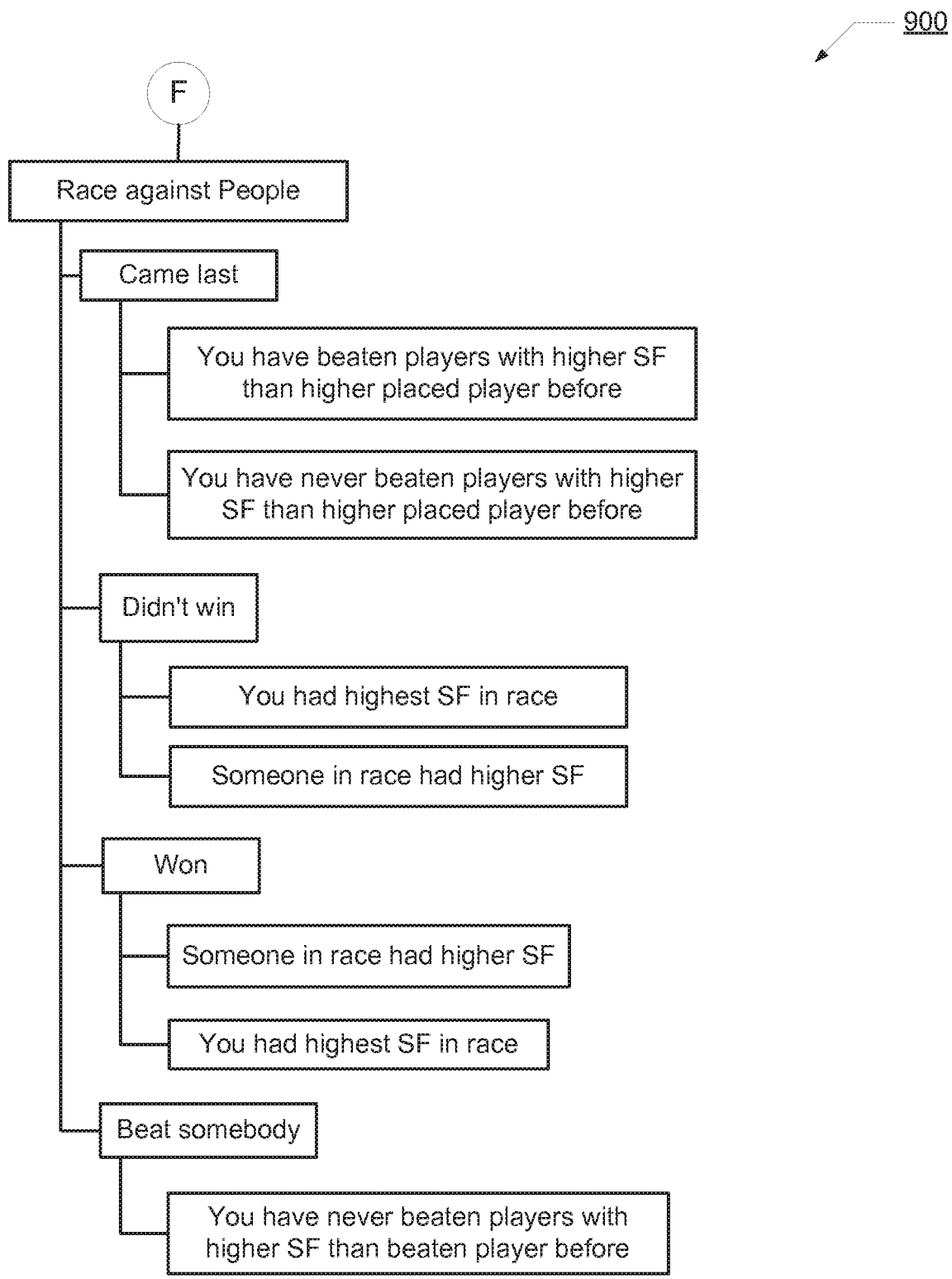
FIG. 9 is a block diagram illustrating a portion of an exemplary embodiment of a comparison machine.
Figure 10:
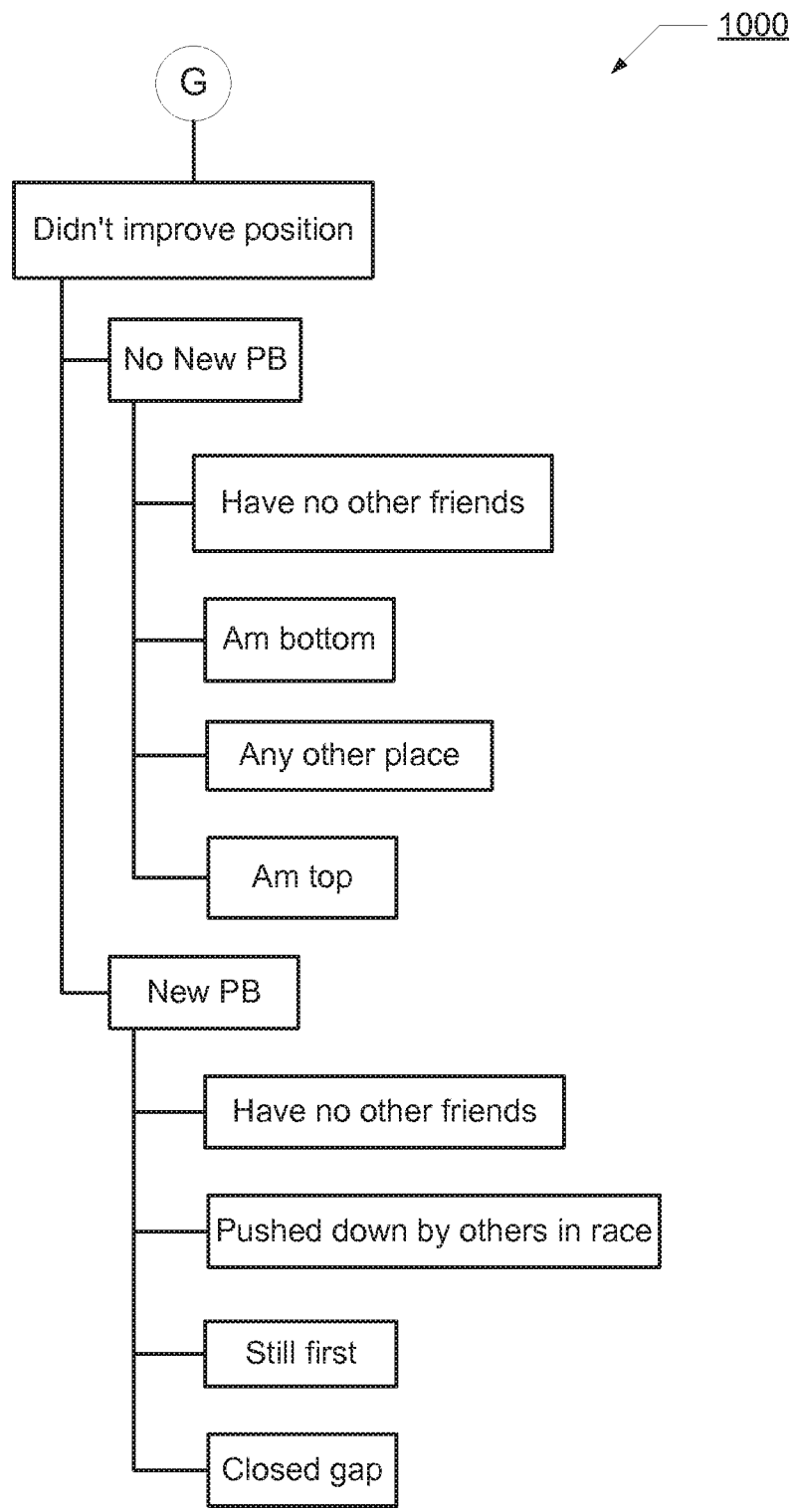
FIG. 10 is a block diagram illustrating a portion of an exemplary embodiment of a comparison machine.
Figure 11:
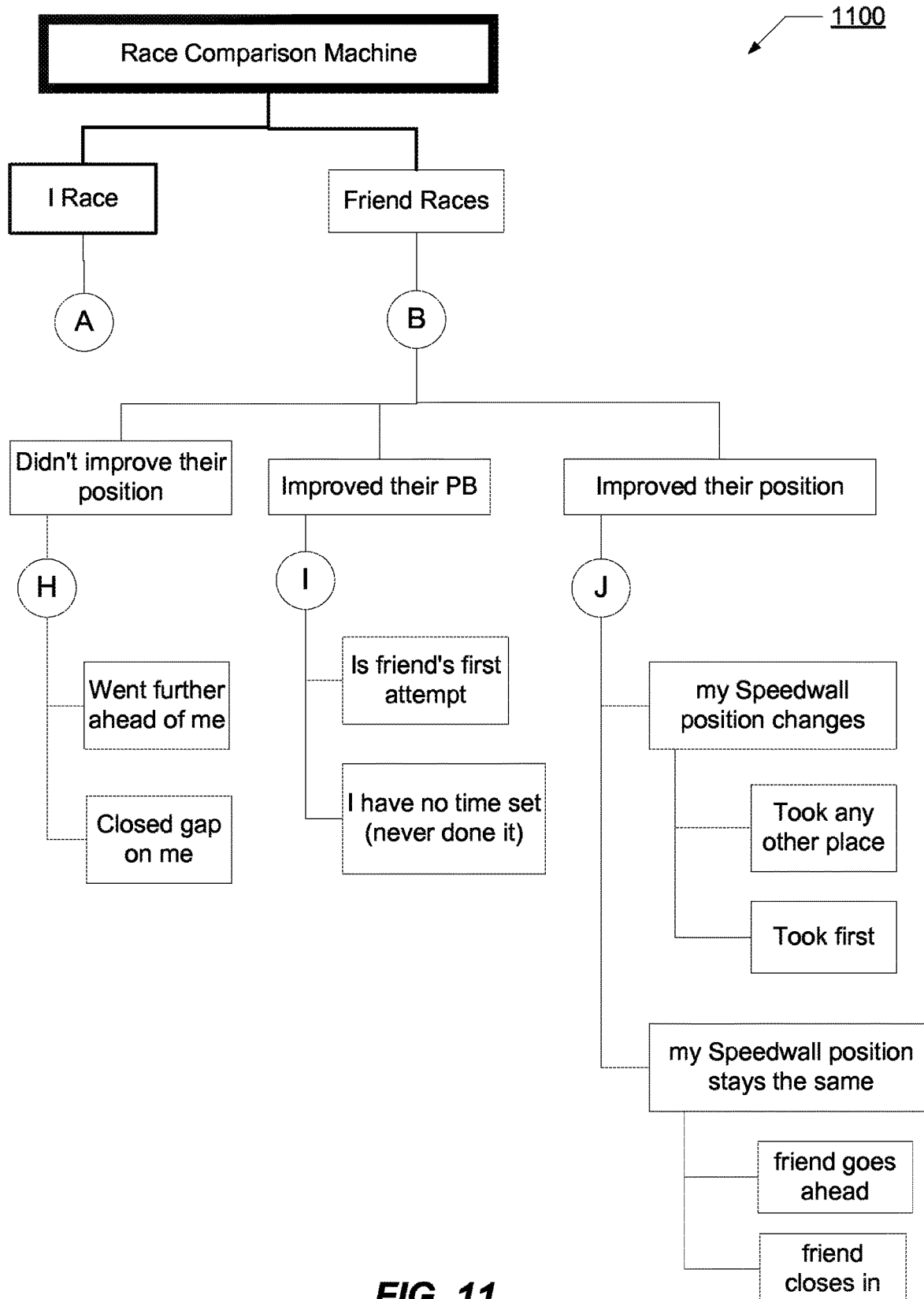
FIG. 11 is a block diagram illustrating a portion of an exemplary embodiment of a comparison machine.

FIG. 6 is a flow chart 600 illustrating an exemplary embodiment of a method for providing automatic game recommendations. The method can include the steps of loading a player profile 610, processing a game play payload 620, playing the game 630, generating a leaderboard 640, comparing a gameplay report against existing leader boards 650, generating stories automatically 660 in accordance with the comparisons, and generating recommendations 670. In an exemplary embodiment, the recommendations are generated using information obtained from the leader board comparisons. For example, if a game player has been beaten by his friends in an event, he could get a recommendation relating to competing in that event again in order to beat his friends' times.

Recommendations can be communicated in any fashion suitable for the given context. In an exemplary embodiment, a recommendation can be brought to a player's attention by way of an alert appearing on the game player's display stating that your friends have beaten you in a particular event or events, and that you can play the event again to beat their score. Recommendations can appear on the news feed of a social network. The news feed item can also include a means for allowing the game player to immediately participate in the game, for example, a link to the game and/or the event that is the subject of the recommendation. If the game player does not already own the game that is the subject of the recommendation, then the game player may be directed to a location (such as an in-game store, URL associated with a vendor that offers the game for sale, etc.) where he can purchase and download the game. If the game player already owns the game but not the particular event, for example, if the event is offered as downloadable content, then the game player may be directed to a location (such as an in-game store, associated with a vendor that offers the game for sale, etc.) where he can purchase and download the event. If the game player already owns the game and the event that is the subject of the recommendation, then the game player can follow the recommendation immediately and attempt to beat his friends' scores in that event.

For example, in the racing game scenario described in FIG. 5, a player who is associated with Craig, Matt, Thomas or Steve through a social network but who has not played the ROADSTERS REBORN race yet, could get a recommendation to participate in that race based on the fact that his friends have done it. By following the recommendation, the player who is new to that event gets an opportunity to compete against his friends in that event. This can enhance the player's game experience by providing competition opportunities for players who are connected socially, directly or indirectly, but who are playing the game asynchronously.

While social connections such as a friends status or friends relationship are described as being the criteria which relates players to each other, it should be appreciated that this the criteria are not limited to this relationship. The criteria may be expanded to reflect any association among game players, for example, clan membership, country, team preferences (which can be based on criteria such as country), game preferences, games played, and genre preferences (racing games, shooters, sports, RPGs, etc.).

In an exemplary embodiment, the recommendation system takes the results of game play around the network and then, based on a selected set of criteria, generates game play recommendations for players based on what the players' friends have been doing. Such recommendations are a great way for game players to get directly into social competition with their friends because they are automatically created when the player's friends beat that player's game play times, especially if many friends have played a particular event, or if there are events that the game player has not tried yet.

TABLE 2

The following table shows an example of a leader board used for creating a set of recommendations based on players' participation in an event called DARK HORSE HOT PURSUIT.

| Position | Player | Car Used | Attempts | Time |
|---|---|---|---|---|
| 1 | Matt Webster | Porsche 911 GT3 RS | 5 | 3:52.43 |
| 2 | Steve Cuss | Aston Martin DBS | 3 | 3:55.62 |
| 3 | Craig Sullivan | Jaguar XKR | 8 | 3:58.31 |
| 4 | Thomas Belmont | Porsche 911 GT3 RS | 3 | 4:00.24 |

In this example, Matt has just gone to the top of the leader board with a new Personal Best time of 3:52.43 s.

Steve Cuss will receive the following recommendation:
BEAT Matt Webster
"Matt Webster beat your time on DARK HORSE by 3.19 s. You're now $2^{nd}$ on the leader board."

Thomas may see the following recommendation:
BEAT Craig Sullivan
"Craig Sullivan is $3^{rd}$ on the DARK HORSE Leader board with a time of 3:58.31 s. 10 Play now to take $3^{rd}$ place."

Craig may see the following recommendation:
BEAT Steve Cuss
"Steve Cuss is now $2^{nd}$ on DARK HORSE with a Personal Best time 2.69 s faster than you. Play now to take $2^{nd}$ from Steve Cuss."

In an exemplary embodiment, an automatic game recommendation system can be constructed to drive social competition by delivering dynamic and personal recommendations to players based on what their friends have played. The system can prioritize stories depending on where players are and if they have been beaten. The system can also suggest a particular event or competition when you are yet to play an event by telling you about a player that the system determines you should be able to beat. For example, if you haven't completed the DARK HORSE event above, then you may automatically get a recommendation to take on Thomas Belmont, as he is the player with the slowest time in this event.

In an exemplary embodiment, the recommendations can be updated sufficiently enough that a player gets the latest updated recommendations when the player views them. The recommendations can also be updated constantly so that the information is always up-to-date. Recommendations are useful for those players with a limited gaming time available to them and who are generally playing asynchronously, as opposed to playing simultaneously with their friends. The recommendation system provides a means for such players get a substantially instant insight into what has been going on inside their social network and have events to play generated by friend performances.

Players can select recommendations to PLAY LATER by marking them on the system so that they are saved for when the player returns to the game. In an exemplary embodiment, the player can access their saved recommendations and play them through a message wall which links them to the particular game or event being recommended.

In an exemplary embodiment, the recommendation system is able to use this rich friends data and comparison information is substantially continuously updated and accessible to the game players. This information can be used to automatically update recommendations based on changes to this data. Additional examples of data that can be tracked and updated in a car racing game includes the players' time spend in each of the available cars in the game. This information can be shared among friends in the game. When choosing a car to take into an event, a game player can see which car the player's friends have used to set their personal bests allowing the game player to make a decision based on what his friends have done. The game player might also receive recommendations associated with this information.

FIGS. 7-11 are a series of diagrams illustrating a block diagram of an exemplary embodiment of a comparison machine used in a system for automatic game comparison. The block diagram illustrates a race recommendation system for a car racing game. It should be noted that comparison engines appropriate for other game genres are also contemplated but are not shown in this particular example.

When a game player sets a new Personal Best (PB) for an event, that player's time in the event is compared to their friends' times in the same event. This information is stored in a leader board data structure associated with that particular game (for example, the Need for Speed Hot Pursuit). In an exemplary embodiment, two types of comparison stories can be generated:

A "you" story to be read from the player's perspective (e.g. "You set a personal best of 2:23.01, 2.1 s slower than TheSoldierBoy in 4th"). For example, see the "I Race" flow in FIGS. 7-11.

A "friend" story to be read from player's friends' perspective (e.g. "Cusster set a personal best of 2:23.01, 2.1 s slower than you in 5th"). For example, see the "Friend Races" flow in FIGS. 7-11.

In an exemplary embodiment, a comparison machine generates a story based on various bits of information associated with the game player, the player's friends and the events that the player and his friend have participated in. A comparison tree can be created for each event type. The comparison tree shown in FIGS. 7-11 is associated with a race. The race can include both offline and online game play events. The comparison tree runs through the comparison machine for every time posted and finds all cases which are true.

For each potential outcome in the comparison tree, a plurality of story templates can be set up for each potential outcome. Within this template, each potential story can have a priority associated with it. The comparison machine can choose the story with the highest priority from all the true cases it has found from the comparison tree.

Story templates can include parameters such as the leader board position that the comparison machine can replace with the appropriate information when it creates the comparison story.

In an exemplary embodiment, the kind of information stored includes the most recent information for substantially every event. For example, the most recent "you" story and the most recent "friend" story can be stored on servers associated with the game recommendation engine.

An example of a recommendation is to recommend the various single-player events from the game. In an exemplary embodiment, hundreds of events may be available with the particular game, and the game recommendation engine may recommend a small portion of the total events from those you have currently unlocked.

In an exemplary embodiment, the recommendation engine selects events in which the game player has an opportunity to beat a friend's time. Since this situation (a friend has completed the event in a faster time than the game player did) could apply to many events in the game, it can be helpful to filter and prioritize the events.

Some example reasons for recommending an event to the player include the following: (1) A Friend beat you on an event ("beat you" means "set a faster time than you on event"); (2) You are a new player to this particular event (you have yet to try this event); (3) Events unlock when you earn a medal for this event; (4) the event is popular, for example, two or more of your friends have recently played this event; and (5) You have yet to win gold for this event.

This information can be further prioritized to produce recommendations based on how recently a friend story has been posted for that event (for example, newest first).

In an exemplary embodiment, a recommendation can include parts such as the following: (1) a "Friend Story:" what a friend has done to make this event interesting to you (for Beat You recommends we use the friend story generated by the Comparison Machine); (2) a "Recommendation Reason:" one of the five reasons described above; (3) a "Call to action:" what you should do in response. The Call to action can depend on the recommendation reason and where you are in the event leader board. For a "Beat You" recommendation, the recommendation can be to beat the person who beat you. For others, the recommendation can be to beat the person above you in the event leader board.

Figure 12:
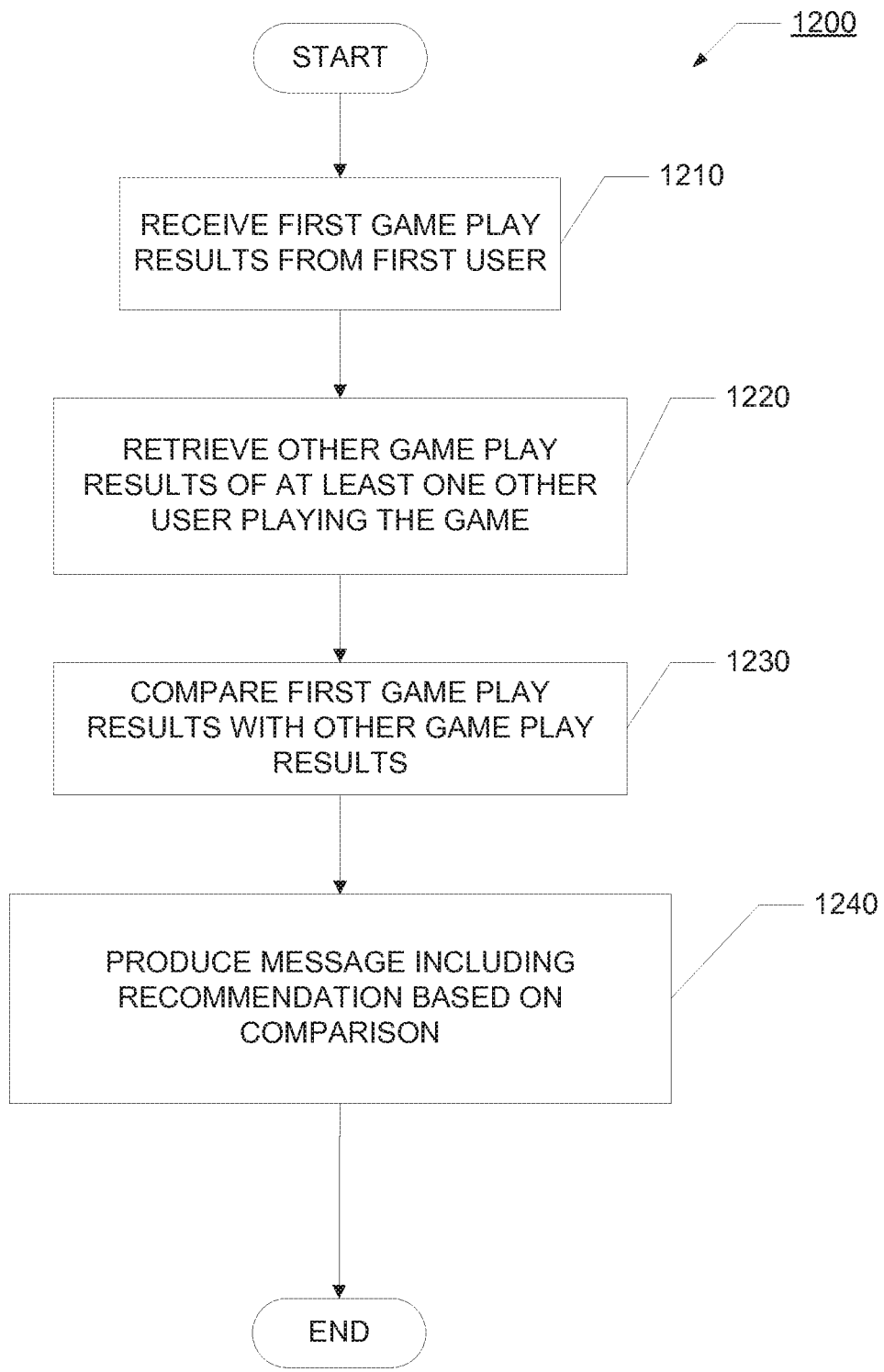
FIG. 12 is a flow chart illustrating a method for generating recommendations an exemplary embodiment.

FIG. 12 is a flow chart 1200 illustrating a method for generating recommendations an exemplary embodiment. In an exemplary embodiment, a method includes receiving first game play results of a first user playing a game 1210, retrieving other game play results of at least one other user playing the game 1220, and comparing the first game play results with the other game play results 1230, producing a message based on the comparison 1240, the message including a recommendation for the first user to improve future game play results over the first game play results, where the recommendation is based on the game play of the other user. The method can further include retrieving attributes associated with the first user and attributes associated with the other user, comparing the first user and the other user attributes, and updating the recommendation based on the comparison. The other user can be a friend. The other user can be one of a group to which the user belongs, such as a geographical location common to the group members, a game entitlement common to the group members or a purchase history having something in common with group members. Exemplary embodiments also include a game system implementing the method and a non-transitory computer-readable storage medium used to perform the method.

Figure 13:
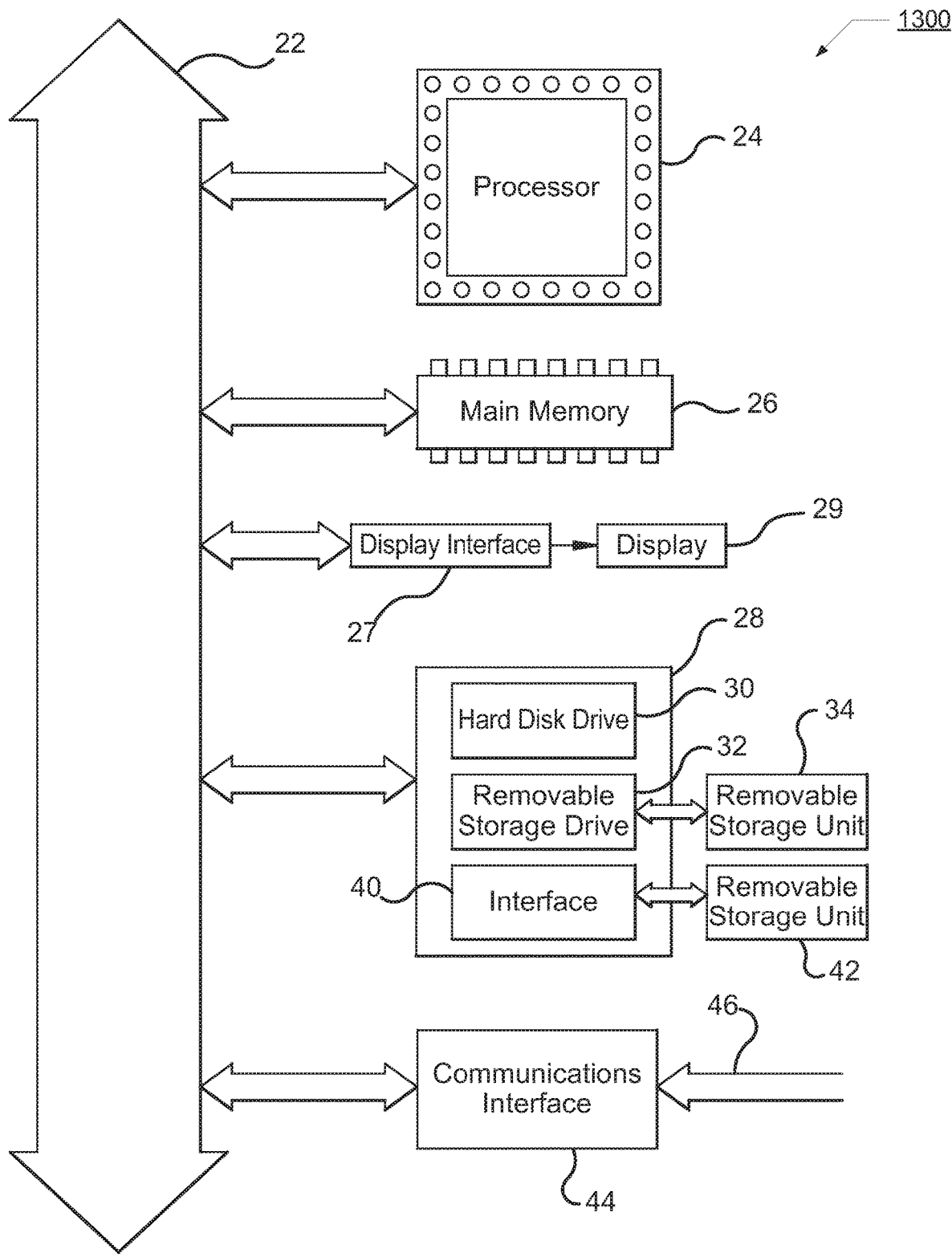
FIG. 13 is a block diagram illustrating a general purpose processing system for running methods in accordance with an exemplary embodiment.

FIG. 13 illustrates a block diagram of a general purpose processing system according to an embodiment of a system for automatic game comparison and recommendation.

The above-described devices, systems, and subsystems of the exemplary embodiments can include, for example, any suitable servers, workstations, PCs, laptop computers, PDAs, Internet appliances, handheld devices, cellular telephones, wireless devices, other devices, and the like, capable of performing the processes of the exemplary embodiments. Multiple devices and subsystems according to the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Networks (PSTNs), Packet Data Networks (PDNs), the Internet, intranets, a combination thereof, and the like.

It is to be understood that the devices and subsystems of the exemplary embodiments are for exemplary purposes, as many variations of the specific hardware used to implement the exemplary embodiments are possible, as will be appreciated by those skilled in the relevant art(s). For example, the functionality of one or more of the devices and subsystems of the exemplary embodiments can be implemented via one or more programmed computer systems or devices.

To implement such variations as well as other variations, a single mobile device or computer system can be programmed to perform the special purpose functions of one or more of the devices and subsystems of the exemplary embodiments. On the other hand, two or more programmed computer systems or devices can be substituted for any one of the devices and subsystems of the exemplary embodiments. Accordingly, principles and advantages of distributed processing, such as redundancy, shared information between users, replication, and the like, also can be implemented, as desired, to increase the robustness and performance of the devices and subsystems of the exemplary embodiments.

The devices and subsystems of the exemplary embodiments can store information relating to various processes described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases thereof.

All or a portion of the devices and subsystems of the exemplary embodiments can be conveniently implemented using one or more general purpose computer systems, microprocessors, digital signal processors, micro-controllers, and the like, programmed according to the teachings of the exemplary embodiments of the present inventions, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present inventions can include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Such computer readable media further can be non-transitory in nature. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the devices and subsystems of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the invention has been described with respect to exemplary embodiments, one skilled in the art will recognize that numerous modifications are possible. Thus, although the invention has been described with respect to exemplary embodiments, it will be appreciated that the invention is intended to cover all modifications and equivalents within the scope of the following claims.

What is claimed is:

1. A method, comprising:
receiving, by a video game server, from a first video game console, a first game play result of a first user playing a video game;
selecting a second user having at least one of: a second game play asset similar to a first game play asset of the first user or a second game play timeline similar to a first game play timeline of the first user;
receiving, from a second video game console, a second game play result of the second user playing the video game;
producing, by comparing the first game play result with the second game play result, a message comprising a recommendation for the first user to improve a future game play result over the first game play result, wherein the message further references the second game play result; and
communicating the recommendation to the first user.

2. The method of claim 1, wherein the second user has a second skill level similar to a first skill level of the first user.

3. The method of claim 1, wherein the second user has a second game play experience similar to a first game play experience of the first user.

4. The method of claim 1, wherein the second user is associated with the first user via a social network.

5. The method of claim 1, wherein the recommendation comprises a reason referencing at least one of: competition, popularity, novelty, or an achievement.

6. The method of claim 1, further comprising:
generating, based on comparing the first game play result with the second game play result, a story referencing the second game play result.

7. The method of claim 1, further comprising:
generating, based on comparing the first game play result with the second game play result, a story referencing the first game play result.

8. The method of claim 1, wherein communicating the recommendation to the first user further comprises:
transmitting the recommendation to the first video game console.

9. The method of claim 1, wherein communicating the recommendation to the first user further comprises:
causing the recommendation to appear in a news feed of a social network associated with the first user.

10. A non-transitory computer-readable storage medium comprising executable instructions that, when executed by a computing system, cause the computing system to:
receive, from a first video game console, a first game play result of a first user playing a video game;
receive, from a second video game console, a second game play result of a second user playing the video game;
produce, by comparing the first game play result with the second game play result, a message comprising a recommendation for the first user to improve a future game play result over the first game play result, wherein the message further references the second game play result;
communicate the recommendation to the first user; and
generate, based on comparing the first game play result with the second game play result, a story referencing at least one of: the first game play result or the second game play result.

11. The non-transitory computer-readable storage medium of claim 10, further comprising executable instructions that, when executed by the computing system, cause the computing system to:
select the second user having a second skill level similar to a first skill level of the first user.

12. The non-transitory computer-readable storage medium of claim 10, wherein the recommendation comprises a reason referencing at least one of: competition, popularity, novelty, or an achievement.

13. The non-transitory computer-readable storage medium of claim 10, wherein communicating the recommendation to the first user further comprises:
transmitting the recommendation to the first video game console.

14. A system, comprising:
a memory; and
a processor coupled to the memory, wherein the processor is configured to:
receive, from a first video game console, a first game play result of a first user playing a video game;
receive, from a second video game console, a second game play result of a second user playing the video game;
produce, by comparing the first game play result with the second game play result, a message comprising a recommendation for the first user to improve a future game play result over the first game play result, wherein the message further references the second game play result;
communicate the recommendation to the first user; and
cause the recommendation to appear in a news feed of a social network associated with the first user.

15. The system of claim 14, wherein the processor is further configured to:
select the second user having a second skill level similar to a first skill level of the first user.

16. The system of claim 14, wherein the recommendation comprises a reason referencing at least one of: competition, popularity, novelty, or an achievement.

17. The system of claim 14, wherein communicating the recommendation to the first user further comprises:
transmitting the recommendation to the first video game console.

* * * * *